United States Patent
Kaufman et al.

(10) Patent No.: US 10,475,020 B2
(45) Date of Patent: Nov. 12, 2019

(54) MOBILE DEVICE ROAMING STATUS SUBSCRIPTION

(71) Applicants: AT&T Intellectual Property I, L.P., Atlanta, GA (US); AT&T Mobility II LLC, Atlanta, GA (US)

(72) Inventors: David Kaufman, Atlanta, GA (US); Andrew Eberhart, Woodstock, GA (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 311 days.

(21) Appl. No.: 14/702,310

(22) Filed: May 1, 2015

(65) Prior Publication Data
US 2016/0321642 A1 Nov. 3, 2016

(51) Int. Cl.
G06Q 20/00 (2012.01)
G06Q 20/32 (2012.01)
H04W 8/14 (2009.01)
G06Q 20/40 (2012.01)
H04W 8/10 (2009.01)

(52) U.S. Cl.
CPC ..... G06Q 20/3224 (2013.01); G06Q 20/4016 (2013.01); H04W 8/10 (2013.01); H04W 8/14 (2013.01)

(58) Field of Classification Search
CPC . G06Q 20/4016; G06Q 20/3224; H04W 8/10; H04J 1/02
USPC ..................................... 705/26, 44
See application file for complete search history.

(56) References Cited

U.S. PATENT DOCUMENTS

| 8,001,049 B2 | 8/2011 | Sobel |
| 8,315,947 B2 | 11/2012 | Aaron |
| 8,364,120 B2 | 1/2013 | Kuhlman |

(Continued)

FOREIGN PATENT DOCUMENTS

| EP | 2826006 | 1/2015 |
| WO | WO 2014182785 | 11/2014 |

OTHER PUBLICATIONS

Ricknäs, Mikael, "AT&T wants to improve overseas credit-card fraud prevention via phone geoloction", PCWorld, pcworld.com, Jun 5, 2014. http://www.pcworld.com/article/2360400/atandt-wants-to-improve-payment-card-fraud-prevention-with-phone-geolocation.html.

(Continued)

Primary Examiner — Rokib Masud

(57) ABSTRACT

Methods, computer-readable media and devices for authorizing a pending payment transaction using mobile device roaming status information are disclosed. For example, a method includes a processor receiving an authorization to monitor the roaming status information of a mobile device, sending a request to a cellular service provider network to monitor the roaming status information of the mobile device, and receiving from the cellular service provider network a notification of the roaming status information of the mobile device. The method may further include the processor receiving a notification of a payment transaction of a payment device associated with a user of the mobile device at a payment location and sending an authorization to continue processing the pending payment transaction when the roaming status information indicates that a location of the mobile device corresponds to the payment location.

20 Claims, 4 Drawing Sheets

(56) References Cited

U.S. PATENT DOCUMENTS

| | | |
|---|---|---|
| 8,521,131 B1 | 8/2013 | Ramalingam |
| 8,566,233 B2 | 10/2013 | Prakash |
| 2003/0182194 A1 | 9/2003 | Choey |
| 2011/0035318 A1 | 2/2011 | Hargrove |
| 2012/0094639 A1 | 4/2012 | Carlson |
| 2012/0209773 A1 | 8/2012 | Ranganathan |
| 2012/0246076 A1 | 9/2012 | Kobayashi |
| 2012/0253957 A1 | 10/2012 | Bakshi |
| 2013/0109407 A1* | 5/2013 | Tipton .......... H04W 12/08 455/456.2 |
| 2013/0132277 A1 | 5/2013 | Naqvi |
| 2013/0185166 A1 | 7/2013 | Larkin |
| 2013/0262311 A1 | 10/2013 | Buhrmann |
| 2014/0067649 A1 | 3/2014 | Kannan |
| 2014/0250009 A1 | 9/2014 | Carlson |
| 2014/0279501 A1 | 9/2014 | Kumar |
| 2014/0316984 A1 | 10/2014 | Schwartz |
| 2014/0349610 A1 | 11/2014 | Dimperio |
| 2015/0017945 A1 | 1/2015 | Eckler |
| 2015/0019425 A1* | 1/2015 | Kumar .......... G06Q 20/4016 705/44 |
| 2015/0026066 A1 | 1/2015 | Aaron |
| 2015/0032624 A1 | 1/2015 | Claridge |

OTHER PUBLICATIONS

"MasterCard and Syniverse Deliver Peace of Mind for Mobile Users," Press Releases: MasterCard, newsroom.mastercard.com, Feb. 25, 2014. http://newsroom.mastercard.com/press-releases/mastercard-and-syniverse-deliver-peace-of-mind-for-mobile-users/.

Yongbin, Zhang, You Fucheng, and Liu Huaqun. Abstract "Behavior-Based Credit Card Fraud Detecting Model". 2009 Fifth International Joint conference on INC, IMS and IDC. 2009. http://dl.acm.org/citation/cfm?id=1683872.

\* cited by examiner

MOBILE DEVICE ROAMING STATUS SUBSCRIPTION

The present disclosure relates generally to methods and apparatus for detecting when an unauthorized payment transaction is likely taking place.

BACKGROUND

Credit card fraud is a significant problem for credit card companies, the merchants that accept such cards, and legitimate card holders. Physical cards are often stolen or misplaced, and then used by someone other than the cardholder in a physical retail establishment. In some cases, a signature on a receipt or on an electronic pad is required, which may then be compared to the cardholder's signature on the card. In addition, the merchant may ask for additional identification, such as a driver's license, in order to verify that the cardholder is the one making the purchase. However, often these steps are not performed.

SUMMARY

Methods, computer-readable media and devices for authorizing a pending payment transaction using mobile device roaming status information by a processor are disclosed. For example, the processor may receive an authorization to monitor the roaming status information of a mobile device, send a request to a cellular service provider network to monitor the roaming status information of the mobile device, and receive from the cellular service provider network a notification of the roaming status information of the mobile device. The processor may further receive a notification of a payment transaction of a payment device associated with a user of the mobile device at a payment location and send an authorization to continue processing the payment transaction when the roaming status information indicates that a location of the mobile device corresponds to the payment location.

Additional methods, computer-readable media and devices for providing mobile device roaming status information to authorize a pending payment transaction by a processor are also disclosed. For example, the processor may be deployed in a cellular service provider network, and may receive a request from a device of a financial entity to monitor roaming status information of a mobile device, receive a message indicating the roaming status information of the mobile device, and send a notification of the roaming status information of the mobile device to the device of the financial entity when the message indicating the roaming status information of the mobile device is received.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
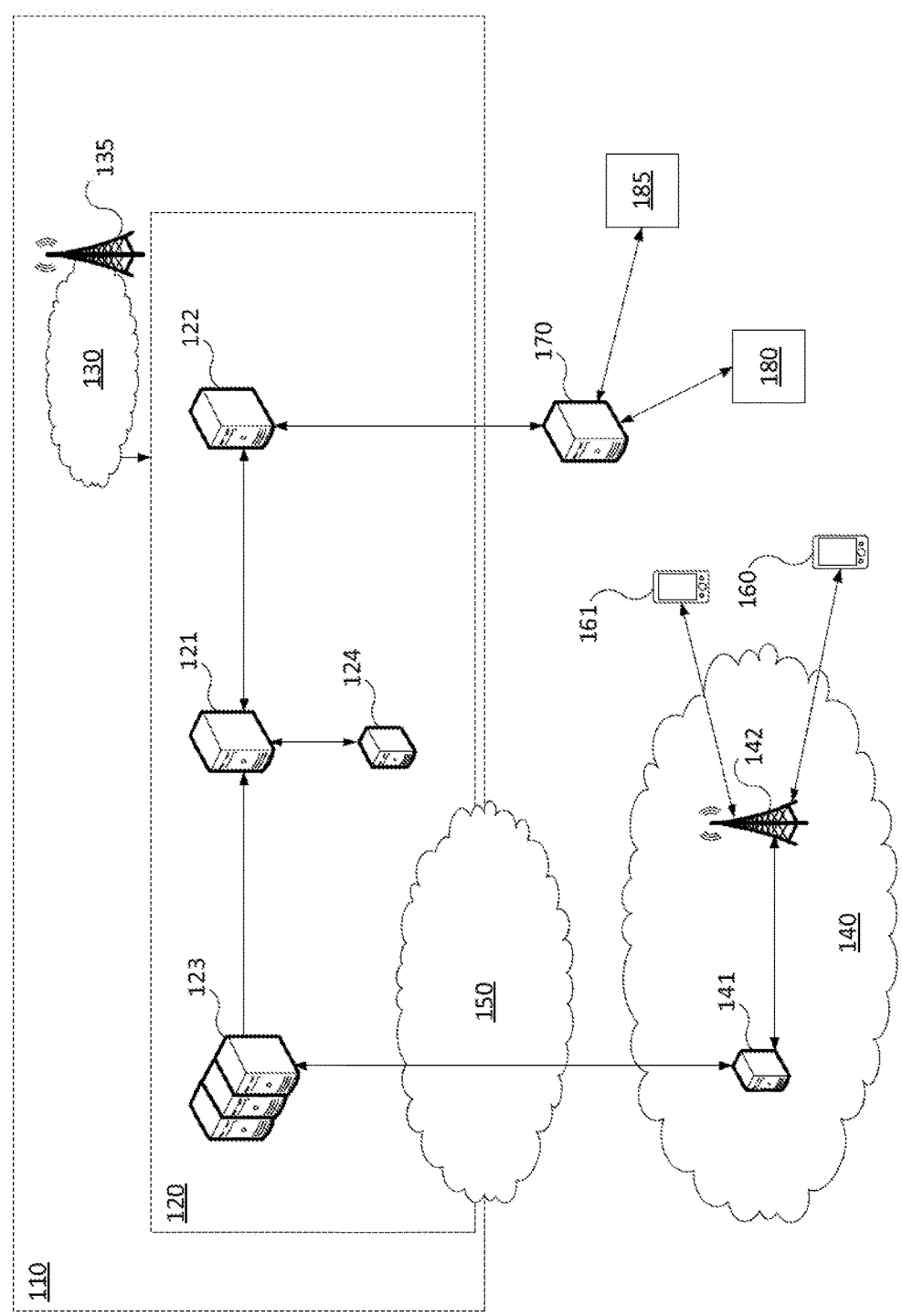
FIG. 1 illustrates an example system related to the present disclosure.

The present disclosure relates to a fraud prevention system for payment device usage. In particular, a roaming status of a user's mobile device is provided for use in determining whether a payment transaction may be fraudulent. In one example, the user, e.g., a mobile subscriber, grants permission to a financial entity, such as his or her credit card provider, bank, or similar entity to access roaming status information regarding the user's mobile device. For example, the user may provide his or her mobile telephone number and/or a device identifier to the financial entity. The financial entity may then subscribe to roaming status updates from the cellular network provider using the device identifier(s). In one example, the financial entity may register subscriptions with respect to blocks of mobile devices for which users, e.g., credit card holders, account holders, or the like who are also mobile subscribers, have granted permission to the financial entity.

In accordance with the present disclosure, the cellular network provider may receive roaming status information regarding a mobile device. If the mobile device is part of a roaming status subscription, the network provider may then automatically push the roaming status information to the financial entity. For example, if a mobile device is carried overseas and registers as a roaming device with a foreign carrier's network, the roaming registration will be notified back to the home network provider and may include such data as: one or more identifiers of the mobile device, an E.164 number, a country code, a carrier code, a time stamp, and so forth. Thus, all or a portion of such information may be automatically forwarded to the financial entity. In one example, the present disclosure may also provide automatic "push" notification to the financial entity when network usage information indicates that the mobile device is back in the home country, e.g., based upon a registration with the home network or other domestic network.

If a payment transaction is attempted with a payment device of the user, such as a credit card, a debit card, an electronic wallet, a radio frequency identification (RFID) tag, an electronic key fob, or any other type of mobile payment system, or a check, a bank note, a letter of credit, and the like, the financial entity is thus already in possession of the roaming status information of the mobile device associated with the user/mobile subscriber. As such, the financial entity may compare the roaming status information to the location of the payment transaction to determine if there are any discrepancies. If so, the transaction may be flagged as a potential fraudulent transaction. Notably, this system is in contrast to arrangements where a payment transaction is instantiated and a request is sent out to a cellular network provider for mobile device location information. In particular, this type of request/response process may incur a substantial latency, e.g., over 30 seconds, which is inconvenient for cashiers and legitimate credit card users, for example. In contrast, utilizing the present disclosure it may be possible to provide a latency of less than a few milliseconds, insofar as the credit card provider or other financial entity is already in possession of the roaming status information.

It should be noted that as used herein, the term "payment transaction" may comprise transactions to pay for goods or services from a merchant, vendor, service provider, etc. The term "payment transaction" may also be used to refer to a transaction to withdraw funds from a bank or other institution, or to transfer funds. Thus, a "payment device" may be used to pay for goods or services, e.g., via a point-of-sale terminal other merchant device, or may be used to extract funds or transfer funds via an automated teller machine (ATM), via a device of a live teller or other representative of the financial entity, and so forth. In this regard, the term "point-of-sale" may refer to a merchant point-of-sale terminal for receiving credit or debit card payments, check payments, and the like, as well as ATMs, teller terminals, and so forth.

To better understand the present disclosure, FIG. 1 illustrates an example network, or system 100 suitable for implementing embodiments of the present disclosure for authorizing a pending payment transaction using mobile device roaming status information and for providing mobile device roaming status information to authorize a pending payment transaction. Although the present disclosure is discussed below in the context of a particular system or network architecture, the present disclosure is not so limited. Namely, the present disclosure can be applied to alternative network configurations that can authorize a pending payment transaction using mobile device roaming status information and provide mobile device roaming status information to authorize a pending payment transaction.

Figure 4:
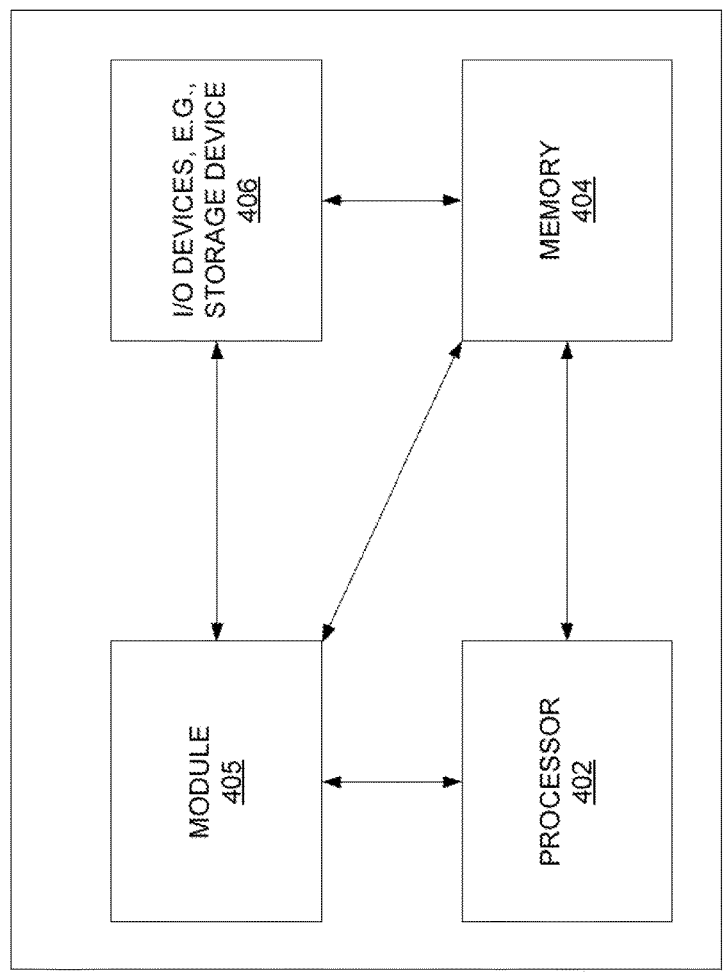
FIG. 4 illustrates a high-level block diagram of a computing device suitable for use in performing the functions, methods, operations, and algorithms described herein.

In particular, system 100 includes a cellular service provider network 110 that may include a core network 120, e.g., a public land mobile network (PLMN)-universal mobile telecommunications system (UMTS)/General Packet Radio Service (GPRS) core network, an Internet Protocol (IP) Multi-media Subsystem (IMS) network, a combination of such networks, and the like, and a cellular access network 130. As illustrated in FIG. 1, core network 120 includes various components such as a production server 123, a roaming status server 121, a subscription interface server 122, and a mobile identification number database (MIND) server 124. In one example, an enterprise customer server 170, e.g., a backend server of a financial entity, is also connected to the core network 120, as described in greater detail below. Broadly, each of these devices may be referred to as an "application server," and may comprise a programmed computing device such as illustrated in FIG. 4 and described below.

In various examples, cellular access network 130 may comprise a radio access network implementing such technologies as: global system for mobile communication (GSM), e.g., a base station subsystem (BSS), GSM enhanced data rates for global evolution (EDGE) radio access network (GERAN), or IS-95, among others, or a UMTS terrestrial radio access network (UTRAN) network, e.g., employing wideband code division multiple access (WCDMA), or a CDMA2000, among others. In still another example, cellular access network 130 may comprise an evolved UTRAN (eUTRAN) that utilizes IMS components of the core network 120 for both voice and data call routing via an all-IP infrastructure. In other words, cellular access network 130 may comprise a network in accordance with any "second generation" (2G), "third generation" (3G), "fourth generation" (4G), Long Term Evolution (LTE), or any other yet to be developed future wireless/cellular network technology. Thus, base station 135 of cellular access network 130 may comprise a base transceiver station (BTS), a NodeB, an evolved NodeB (eNodeB), and so forth.

In accordance with the present disclosure, cellular service provider network 110 is also connected to and in communication with a roaming carrier network 140, e.g., an international peer network. Although roaming carrier network 140 may be similar to cellular service provider network 110, e.g., including a core network, a cellular access network, and so forth, for illustrative purposes, roaming carrier network 140 has been simplified to only show a serving mobile switching center (MSC)/visiting location register (VLR) 141 and base station 142, e.g., a NodeB, an eNodeB, etc. In one example, cellular service provider network 110 and roaming carrier network 140 are connected via a signaling network 150, such as a Signaling System 7 (SS7) network. In various examples, signaling network 150 may be operated by cellular service provider network 110, roaming carrier network 140, or a different network operator.

In one example, the core network 120 collects and provides roaming status information of mobile devices for which cellular service provider network 110 is a home network, e.g., mobile devices of subscribers. For instance, cellular service provider network 110 may be a home network for mobile device 160. In one example, mobile device 160 may be associated with a user who is also a credit card holder, and account holder, or the like with respect to the financial entity. Mobile device 160 may comprise any type of cellular-capable mobile telephony and computing device (broadly, a "mobile device"), such as: a mobile phone, a smartphone, a computing tablet, a messaging device, a personal computer, a laptop computer, a Personal Digital Assistant (PDA), and the like. Thus, endpoint device 160 is equipped with at least one cellular radio/transceiver for communications with cellular access network 130, core network 120, roaming carrier network 140, and so forth. Mobile device 160 may also be equipped for any number of different modes of communication. For instance, mobile device 160 may be further equipped with an IEEE 802.11 transceiver, an IEEE 802.16 transceiver, a Bluetooth transceiver, and so on.

As illustrated in FIG. 1, mobile device 160 may be in communication with base station 142 and may be receiving services from roaming carrier network 140. Base station 142 may also serve additional mobile devices, such as mobile device 161, which may also be roaming, or for which roaming carrier network 140 may be a home network. Roaming carrier network 140 may determine that mobile device 160 is roaming by receiving one or more messages from mobile device 160 in connection with registration on the roaming carrier network 140. For instance, mobile device 160 may include one or more mobile device identifiers in registration messages sent to the base station 142, such as: an international mobile subscriber identity (IMSI), an international mobile equipment identity (IMEI), a mobile subscriber identity number (MSIN), which may be contained within the IMSI, a mobile equipment identifier (MEID), an electronic serial number (ESN) or mobile identification number (MIN), an integrated circuit card identifier (ICCID), a telephone number, e.g., an E.164 number or a number that is translatable into E.164 format, and so forth. These identifiers may be retrieved from a subscriber identity module (SIM) card, from a universal integrated circuit card (UICC) and/or from a universal SIM (USIM) of the UICC, and so forth.

In one example, base station 142 may forward registration messages to MSC/VLR 141, which may determine, using any one or more of such identifiers, that the mobile device 160 is a roaming device on roaming carrier network 140. For example, the mobile country code (MCC) portion of the IMSI may indicate that the mobile device 160 is from a foreign country (with respect to the roaming carrier network 140). In addition, any one or more of such identifiers may be sufficient to identify the home network of mobile device 160, e.g., cellular service provider network 110. Depending upon the particular access network and/or the particular connection method utilized by mobile device 160, different device identifiers may be received for mobile device 160 at different times, e.g., depending upon whether base station 142 comprises a component of 3G/GSM network, an LTE network, and so forth.

Upon a registration attempt by mobile device 160 on roaming carrier network 140, roaming carrier network 140 may send a notification to and request further information from cellular service provider network 110. For example, roaming carrier network 140 may send one or more registration messages via the signaling network 150 that include: one or more mobile device identifiers of mobile device 160, an E.164 number, a carrier code of roaming carrier network 140, e.g., a mobile network code (MNC), a country code, e.g., a mobile country code (MCC), a time stamp, and so forth. In one example, additional information such as a public land mobile network identity (PLMN-ID), a tracking area code (TAC), a globally unique tracking area identity (TAI), and other more or less detailed information may also be included.

In response, cellular service provider network 110 may authenticate mobile device 160 to roaming carrier network 140, provide authorization for roaming services and charges for mobile device 160, and so on. Cellular service provider network 110 may further update one or more databases in response to notification that mobile device 160 is connected to roaming carrier network 140, such as updating location information of mobile device 160 in a home location register (HLR), a home subscriber server (HSS), a network equipment locator service (NELOS) server, and so forth (broadly "cellular location systems"). Roaming carrier network 140 may further send update messages to cellular service provider network 110 regarding mobile device 160, such as billing and usage information when mobile device 160 is involved in a call or consuming data, deregistration information, when mobile device 160 is turned off or otherwise departs from the service area of roaming carrier network 140, and so on. Update messages may include: a session management message, a response to a paging message, a location update message, or similar message from the device 160, or a message derived from the aforementioned, and may be received via one or more network elements of roaming carrier network 140. In any case, cellular service provider network 110 may update HSS, HLR, NELOS, billing and traffic servers, and the like, upon receiving update messages of this nature from the roaming carrier network 140.

In one example, registration and update messages from roaming carrier network 140 are received at production server 123. In one example, production server 123 may comprise a production platform that receives registration and update messages (or messages derived from registration and updated messages) pertaining to roaming mobile devices from international peer networks, such as roaming carrier network 140. In one example, production server 123 generates a data feed of roaming status information that is sent to roaming status server 121. In one example, roaming status information may include all or a portion of the information received in messages from roaming carrier network 140, including, for example: one or more mobile device identifiers of mobile device 160, a carrier code of roaming carrier network 140, a country code, an E.164 number, and a time stamp. In one example, the RSS feed may aggregate roaming status information for a number of roaming mobile devices. For instance, production server 123 may receive messages from a number of international peer networks regarding a number of mobile devices. When each message is received and processed, roaming status information for the associated mobile device may then be propagated to the roaming status server via the data feed.

In one example, after receiving the roaming status information via the data feed, roaming status server 121 may then store roaming status information of mobile device 160 (and of other mobile devices). For instance, roaming status server 121 may host a database for storing roaming status information pertaining to various mobile devices. In one example, the database may be indexed by mobile identification number (MIN). In one example, MINs are obtained from MIND server 124, which may store MINs in connection with an electronic serial number (ESN), or other device identifier. In one example, the roaming status information that is stored in roaming status server 121 may include all or a portion of the roaming status information that is received by the roaming status sever 121 via the data feed from the production server 123. As such, in one example, the identifier(s) contained in incoming roaming status information may be correlated to a MIN before storage in the appropriate record.

In one example, enterprise customer server 170 communicates with subscription interface server 122, e.g., utilizing a roaming status information application programming interface (API). In one example, a user may grant permission to a financial entity to access roaming status information regarding the user's mobile device 160. For example, the user may inform the financial entity of one or more mobile device identifiers for mobile device 160. The financial entity may then subscribe to roaming status information updates from the cellular service provider network 110 using the one or more device identifiers. In one example, the financial entity may register a subscription with respect to a group of one or more mobile devices for which users, e.g., customers, card holders, or account holders, have granted permission to the financial entity. For instance, groups can be created by risk profile, by a card or account type, e.g., gold, silver, bronze, etc., by billing addresses, and so forth. In this regard, subscription interface server 122 may receive a subscription request from enterprise customer server 170, and may determine that the subscription request is properly formatted, whether the user has authorized this type of subscription request, and so forth. For example, a user may recite an incorrect mobile device identifier to the financial entity, such that when the enterprise customer server 170 of the financial entity makes a subscription request, no mobile device associated with the mobile device identifier is found. Thus, for instance, subscription interface server 122 may return an error message to enterprise customer server 170.

In one example, properly formatted and user-authorized subscription requests are forwarded from subscription interface server 122 to roaming status server 121 for registration and implementation. For instance, roaming status server 121 may store and track multiple subscriptions that are received from enterprise customer server 170 as well as from other enterprise customer servers, e.g., associated with one or more different financial entities. As such, when new roaming status information is received at roaming status server 121 from the production server 123, roaming status server 121 may check the roaming status information against registered subscriptions to determine if the roaming status information pertains to one of the mobile devices of one of the subscriptions. If so, the new roaming status information may be checked against stored roaming status information in roaming status server 121 with respect mobile device 160. If the comparison indicates that there has been a change in the roaming status information of mobile device 160, then the new roaming status information may be forwarded to the subscribing entity, e.g., enterprise customer server 170 in the example of FIG. 1. For instance, the new roaming status information may be sent in a roaming status information update message via subscription interface server 122. In addition, the new roaming status information may replace the roaming status information that was previously stored by roaming status server 121 with respect to mobile device 160.

In accordance with the present disclosure, roaming status server 121 may also receive notifications that a mobile device has returned to the home network (e.g., cellular access network 130/cellular service provider network 110) after a period of roaming. For example, if mobile device 160 is with a user who is travelling abroad and who then returns back to the home country, the mobile device 160 may send one or more registration messages attempting to connect via base station 135. The registration messages may include a device identifier such as: an IMSI, an IMEI, a MSIN, a MEID, an ESN or MIN, an ICCID, a telephone number, e.g., an E.164 number or a number that is translatable into E.164 format, and so forth, as well as a time stamp. The registration attempt(s) of mobile device 160 via cellular access network 130 may then cause an updating of location information in a home location register (HLR), a home subscriber server (HSS), a network equipment locator service (NELOS) server, and so forth.

Notably, roaming status server 121 may also be notified of a registration attempt of mobile device 160 with cellular access network 130. For instance, a registration message (or a message derived from a registration message) may be forwarded to the production platform 123 from one or more components of cellular service provider network 110. Accordingly, the production server 123 may be connected directly or indirectly to any one or more network elements of cellular access network 130, core network 120, and of the system 100 in general, that are configured to gather and forward network signaling and traffic data and other information and statistics to the production server 123. Due to the relatively large number of connections available between production server 123 and other network elements, none of the actual links to the production server 123 are shown in FIG. 1, aside from the link to roaming carrier network 140 via signaling network 150.

The messages received by production server 123 from components of cellular service provider network 110 may include the same or similar information as is contained in the registration messages received from roaming carrier networks regarding roaming mobile devices. In one example, the production server 123 may then generate roaming status information derived from messages within the home network that pertain to mobile device 160, and place the roaming status information into the data feed that is sent to the roaming status server 121. It should be noted that update messages of mobile device 160 via cellular access network 130 may also be handled in a similar manner as described above.

The roaming status server 121 may then check the roaming status information against registered subscriptions to determine if the roaming status information pertains to one of the mobile devices of one of the subscriptions. If so, the new roaming status information may be checked against stored roaming status information in roaming status server 121 with respect mobile device 160. If the comparison indicates that there has been a change in the roaming status information of mobile device 160, then the new roaming status information may be forwarded to the subscribing entity, e.g., enterprise customer server 170 in the example of FIG. 1. For instance, the new roaming status information may be sent in a roaming status information update message via subscription interface server 122. In addition, the new roaming status information may replace the roaming status information that was previously stored by roaming status server 121 with respect to mobile device 160.

As such, for a mobile device that is the subject of a registered subscription, roaming status server 121 provides push notification of changes to roaming status information of the mobile device to the subscribing entity. For example, if a mobile device is carried overseas and registers as a roaming device with a foreign carrier's network, the roaming registration will be notified back to the home network and automatically forwarded to the financial entity. Likewise, an automatic "push" notification may be provided to the financial entity when network usage information indicates that the mobile device is back in the home country, e.g., a registration with the home network.

Notably, the enterprise customer server 170 may then store and use the roaming status information of mobile device 160 in connection with authorizing or declining payment transactions involving a payment device of the user of mobile device 160. For instance, the user may attempt a payment transaction involving point-of-sale terminal (POS) 180 while travelling abroad. In addition, the attempted payment transaction may be notified from POS 180 to the financial entity for authorization. The financial entity may then compare information regarding the attempted payment transaction such as the location of the point-of-sale terminal, the time of the attempted payment transaction, and so forth with roaming status information of the mobile device 160, e.g., at enterprise customer server 170. The location of a point-of-sale terminal can be stored in advance by the financial entity such that each time a payment transaction with a payment device is commenced, the location can be determined.

If the roaming status information indicates that the mobile device 160 is roaming on roaming carrier network 140, and if the POS 180 is located within the same foreign country as roaming carrier network 140, then enterprise customer back-end server 170 may authorize the payment transaction, or may at least indicate that a roaming status check for the pending payment transaction has been successfully passed. For instance, the payment transaction may be declined for another reason, such as insufficient funds, notwithstanding that the roaming status information appears to indicate that the user and his or her mobile device 160 are located within the same country as POS 180.

However, in another example, if the roaming status information stored by enterprise customer server 170 indicates that the mobile device 160 is currently or most recently registered on the home network (e.g., cellular service provider network 110), then the attempted payment transaction at POS 180 in the foreign country may be flagged as potentially fraudulent. As such, the enterprise customer server 170 may send a response message to POS 180 declining the pending payment transaction, or requiring additional user authentication measures, such as providing photo identification, entry of a pin or passcode, and so forth.

In still another example, the roaming status information stored by enterprise customer server 170 may indicate that the mobile device 160 is currently or most recently registered with roaming carrier network 140. Thus, it may indicate that mobile device 160 is currently located in a foreign country in which roaming carrier network 140 is located. Accordingly, if enterprise customer server 170 receives a notification of a pending payment transaction from POS 185, located in the same country as the home network (cellular service provider network 110), the pending payment transaction may also be flagged as potentially fraudulent. As such, the enterprise customer server 170 may send a response message to POS 185 declining the pending payment transaction, or requiring additional user authentication measures. Notably, the financial entity is already in possession of roaming status information of mobile device 160 prior to receiving notification of any attempted payment transactions, since any updates to the roaming status information are automatically pushed from roaming status server 121 and subscription interface server 122. This system is in contrast to arrangements where a payment transaction is instantiated and a request is sent out to a mobile network provider for mobile device location information of a subscriber.

It should be noted that the example of FIG. 1 has been simplified for purposes of illustration. Thus, it should be understood that system 100 may include additional components, different components, or may have components arranged in a different manner from that which is illustrated in FIG. 1. For example, cellular service provider network 110 may include multiple cellular access networks, with multiple base stations and additional devices such as radio network controllers (RNCs) (alternatively referred to as base station controllers (BSCs) in 2G terminology), and other components for managing communication of mobile devices that are being handled by the cellular service provider network 110. Similarly, devices omitted from the illustration of cellular service provider network 110 may include: components of a public land mobile network (PLMN), GPRS network elements, such as serving GPRS support nodes (SGSNs), gateway GPRS support nodes (GGSNs), and related support components including media servers, application servers, and the like. Similarly, any one or more of core network 120, cellular access network 130, roaming carrier network 140, or signaling network 150 may each run atop an IP/MPLS network infrastructure, or may utilize various different technologies, e.g., Asynchronous Transfer Mode (ATM), Frame Relay, and so forth, the details of which are also omitted from FIG. 1.

Likewise, only a single foreign carrier network is illustrated (roaming carrier network 140). However, the cellular service provider network 110 may have peering and/or roaming arrangements with a number of foreign carrier networks in a number of different foreign countries. In addition, only a single enterprise customer server 170 is illustrated in FIG. 1. However, in various implementations a single financial entity may have multiple servers deployed for use in connection with fraud prevention using mobile device roaming status information. Thus, in one example, the financial entity may, as part of a subscription request that is presented to subscription interface server 122, indicate a preferred destination to send roaming status information. For instance, the financial entity may identify different destinations for roaming status information of different groups of mobile devices, where any one or more of the different destinations may comprise a device that is different from enterprise customer server 170. Thus, the example of system 100 is merely illustrative of one network configuration that is suitable for implementing examples of the present disclosure. As such, other logical and/or physical arrangements for the system 100 may be implemented in accordance with the present disclosure.

Figure 2:
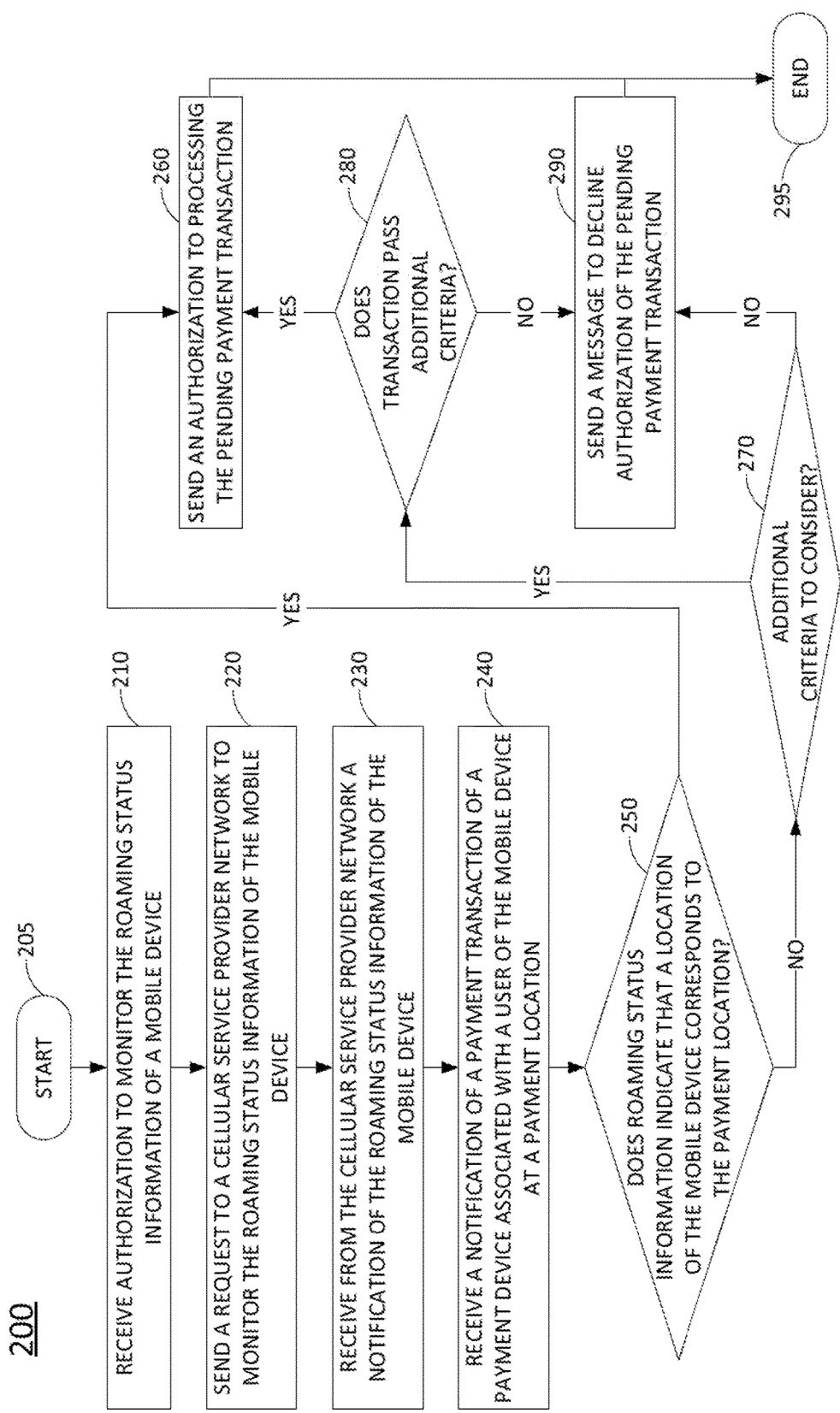
FIG. 2 illustrates a flowchart of a method for authorizing a pending payment transaction using mobile device roaming status information, according to the present disclosure.

FIG. 2 illustrates a flowchart of a method 200 for authorizing a pending payment transaction using mobile device roaming status information. In one example, the steps, operations, or functions of the method 200 may be performed by any one or more of the components of the system 100 depicted in FIG. 1. For example, the method 200 may be performed by enterprise customer server 170, e.g., an application server. In another example, the method 200 is performed by enterprise customer server 170 together with one or more other devices of system 100 in a distributed manner and in coordination with one another. Alternatively, or in addition, one or more steps, operations or functions of the method 200 may be implemented by a computing device having a processor, a memory and input/output devices as illustrated below in FIG. 4, specifically programmed to perform the steps, functions, and/or operations of the method. Although any one of the elements of system 100 may be configured to perform various steps, operations, or functions of the method 200, the method will now be described in terms of an example where steps of the method are performed by a processor, such as processor 402 in FIG. 4.

The method 200 begins in step 205 and proceeds to step 210. In step 210, the processor receives an authorization to monitor the roaming status information of a mobile device. For example, the processor may be deployed in a device of a financial entity network and may receive authorization from a user to monitor the roaming status information of the user's mobile device. In one example, the authorization may include one or more mobile device identifiers that may enable the mobile device to be identified. For instance, the user may include in the authorization one or more of: an IMSI, an IMEI, a MSIN, a MEID, an ESN or MIN, an ICCID, a telephone number, e.g., an E.164, a number or a number that is translatable into E.164 format, and the like. In one example, the authorization may further include an identification of the cellular service provider network of the user's mobile device. However, in another example, the identity of the cellular service provider network may be determined from a mobile device identifier, where at least a portion of the mobile device identifier identifies the cellular service provider network, e.g., a mobile network code (MNC).

At step 220, the processor sends a request to a cellular service provider network to monitor the roaming status information of the mobile device. In one example, the request may comprise a subscription request. In one example, the subscription request may pertain to one or more groups of mobile devices, where at least one of the one or more groups of mobile devices may include the mobile device of the user providing the authorization that is received at step 210. In one example, the request may include the one or more mobile device identifiers that may be received in the authorization. In addition, the request may specify one or more destinations to which roaming status information regarding the mobile device should be sent. In one example, the one or more destinations may be assigned on a per-group basis, e.g., where the request may include one or more groups.

In one example, a response may be received from the cellular service provider network following the request. For example, if no mobile device can be found that corresponds to the mobile device identifier(s) that are provided, the cellular service provider network may response with an error message. On the other hand, if a mobile device corresponding to the mobile device identifier(s) is found, a response may confirm that the request has been accepted by the cellular service provider network. Where the request pertains to one or more groups of mobile devices, any errors/exceptions or confirmations may be provided on a per-mobile device basis, on a per-group basis, and/or on a per-request (per-subscription) basis. In one example, the request may be sent to a subscription interface server of the cellular service provider network.

At step 230, the processor receives from the cellular service provider network a notification of the roaming status information of the mobile device. In one example, the processor continues to receive new/updated roaming status information of the mobile device whenever there is a change to the roaming status information. For example, the cellular service provider network may receive roaming status information pertaining to a mobile device on a continuous basis, where the roaming status information may be derived from: registrations and updates from roaming carrier networks, registrations from the mobile device on the home network (i.e., the cellular service provider network), and so forth. The cellular service provider network may compare any new roaming status information against previously stored roaming status information. If there is a change in the roaming status information, then a notification may be sent by the cellular service provider network and may be received by the processor at step 230. For instance, the processor may detect a change in the roaming status information that indicates the mobile device has returned to the home network after having been detected as roaming on a particular foreign carrier network, or may detect that the mobile device has moved from a foreign carrier network in a first country to a different foreign carrier network in a second country, and so forth.

In one example, at step 230 the processor may store the most current roaming status information of the mobile device. In other words, upon receiving a notification of the roaming status information, any previously stored roaming status information is replaced with the new/updated roaming status information that is received in the notification. In one example, the roaming status information is stored by a server, such as roaming status server 121 of FIG. 1. In one example, a notification may not necessarily indicate a change to the roaming status information. For instance, the cellular service provider network may send a notification that the roaming status information sent in a last notification remains valid. Alternatively, or in addition, a notification may indicate that roaming status information previously provided by the cellular service provider network, and currently stored by the financial entity, is invalid. In such case, the notification may omit certain roaming status information of the mobile device. For instance, the previous or last received roaming status information may have indicated that the mobile device was roaming in a particular foreign country. However, the mobile device may have been switched off and therefore has not been detected as roaming on any particular foreign network, and has also not been detected on the home network. As such, a notification from the home network/cellular service provider network may not provide any location of the mobile device, but may instead indicate that previous roaming status information is no longer reliable insofar as the mobile device has not been detected for a particular period of time.

At step 240, the processor receives a notification of a payment transaction involving the payment device of the user. For example, a point-of-sale terminal may provide notification of a payment transaction in order to obtain authorization from the financial entity. Thus, the notification may include the payment device information, e.g., an account number, a credit card number, an expiration date, a name on card, and/or a security code, and so forth. The payment device information may vary depending upon the type of payment device used. The notification may also identify the particular point-of-sale terminal, the merchant, and/or the location of the payment transaction. Notably, the notification may be received from a point-of-sale (POS) terminal that is located within the home country of the user (and of the user's cellular service provider network), or that is located within a foreign country.

At step 250, the processor determines whether the roaming status information indicates that a location of the mobile device corresponds to the payment location. In one example, the processor may determine the location of the payment transaction based upon an identity that is provided, e.g., by lookup in a database that matches merchants and/or point-of-sale terminals to particular locations by coordinates, street address, or other location identifier. In another example, the point-of-sale terminal may provide its location as part of the notification. The processor may determine the location of the user's mobile device based upon stored roaming status information. For example, the processor and/or other component(s) of a network of the financial entity may store roaming status information that may include data such as: one or more mobile device identifiers of the mobile device, a country code, and a time stamp. Alternatively, or in addition, the roaming status information may include a carrier code, e.g., a mobile network code (MNC), a public land mobile network identity (PLMN-ID), a tracking area code (TAC), a globally unique tracking area identity (TAI), and other more or less detailed information. Thus, in one example, the location of the mobile device may be determined at a country level based upon a country code in the roaming status information currently stored for the mobile device. However, in another example, the location of the mobile device determined from the roaming status information may be more localized, e.g., to a particular tracking area.

It should be noted that not all payment devices may be associated with a mobile device for purposes of fraud prevention using roaming status information in accordance with the present disclosure. Thus, upon receiving notification of a payment transaction, the processor or another component of the financial entity network may first determine whether or not the payment transaction relates to a payment device for which authorization has been provided to monitor the roaming status information. In this regard, step 250 may include first determining the mobile device associated with the payment device prior to performing a lookup of the roaming status information of the mobile device. However, for illustrative purposes the flowchart of the present method 200 only indicates operations with respect to a payment transaction that involves a payment for which authorization of mobile device roaming status information monitoring has been provided.

In any event, when the roaming status information indicates that the mobile device is in a location that corresponds to the location of the payment transaction, then the method 200 proceeds to step 260. For instance, when the location of the payment transaction is determined to be in a particular foreign country, the mobile device may be determined to be in a corresponding location when a country code in the roaming status information stored by the financial entity indicates a same country as the location of the payment transaction. Similarly, when the location of the payment transaction is determined to be in a home country, the mobile device may be determined to be in a corresponding location when a country code in the roaming status information stored by the financial entity indicates the mobile device is not roaming, i.e., is located within the home country. On the other hand, if the location of the mobile device, as determined from the roaming status information, and the location of the payment transaction do not match, then the method 200 proceeds to step 270. For example, the location information of the mobile device may indicate that the mobile device is not roaming, or is roaming in a different foreign country than the foreign country in which the payment transaction is initiated. Similarly, location information of the mobile device may indicate that the mobile device is roaming in a foreign country, whereas the payment transaction is initiated from a location within the home country.

At step 260, the processor sends an authorization to process the payment transaction. In one example, the authorization may be sent to a point-of-sale terminal or other device from which the notification was received at step 240. The authorization may grant permission to complete the payment transaction. However, in one example, the authorization may simply indicate that the payment transaction has passed a roaming status fraud check. In other words, the payment transaction may continue to be processed, but may be declined for a different reason, such as other fraud indicators, insufficient funds, etc. Following step 260, the method 200 proceeds to step 295 where the method ends.

At step 270, the processor determines whether there are any additional criteria to consider. For example, notwithstanding that the roaming status information of the mobile device is either unavailable or may indicate that the mobile device location does not correspond to the payment location, other criteria may be considered which may still result in the processor authorizing the payment transaction. If there are additional criteria to consider, the method 200 may proceed to step 280. Otherwise, the method may proceed to step 290.

At step 280, the processor determines whether the payment transaction satisfies one or more additional criteria. In one example, an interim message may be sent indicating that an initial mobile device roaming status information fraud check has failed, but may request that one or more additional criteria be applied. For example, one or more options for heightened security may be requested such that the payment transaction may eventually be approved, or ultimately denied. For instance, the user may be asked to call and speak with a live customer service representative of the financial entity and to provide certain authentication information. Other enhanced security measures may alternatively or additionally be implemented, such as requiring a signature, presenting a photo identification, and so forth. When the user provides satisfactory answers, additional credentials, and so forth, the payment transaction may be allowed to proceed, i.e., the additional criteria is/are satisfied, and the method 200 may proceed to step 260, where the processor sends an authorization. Otherwise, the payment transaction may be affirmatively declined. In particular, the method 200 may proceed to step 290.

At step 290, the processor sends a message declining authorization of the payment transaction. For instance, the message may be sent to a point-of-sale terminal or other device from which the notification was received at step 240. The message may indicate that the payment transaction has been canceled or should be canceled. Following step 290, the method 200 proceeds to step 295 where the method ends.

Figure 3:
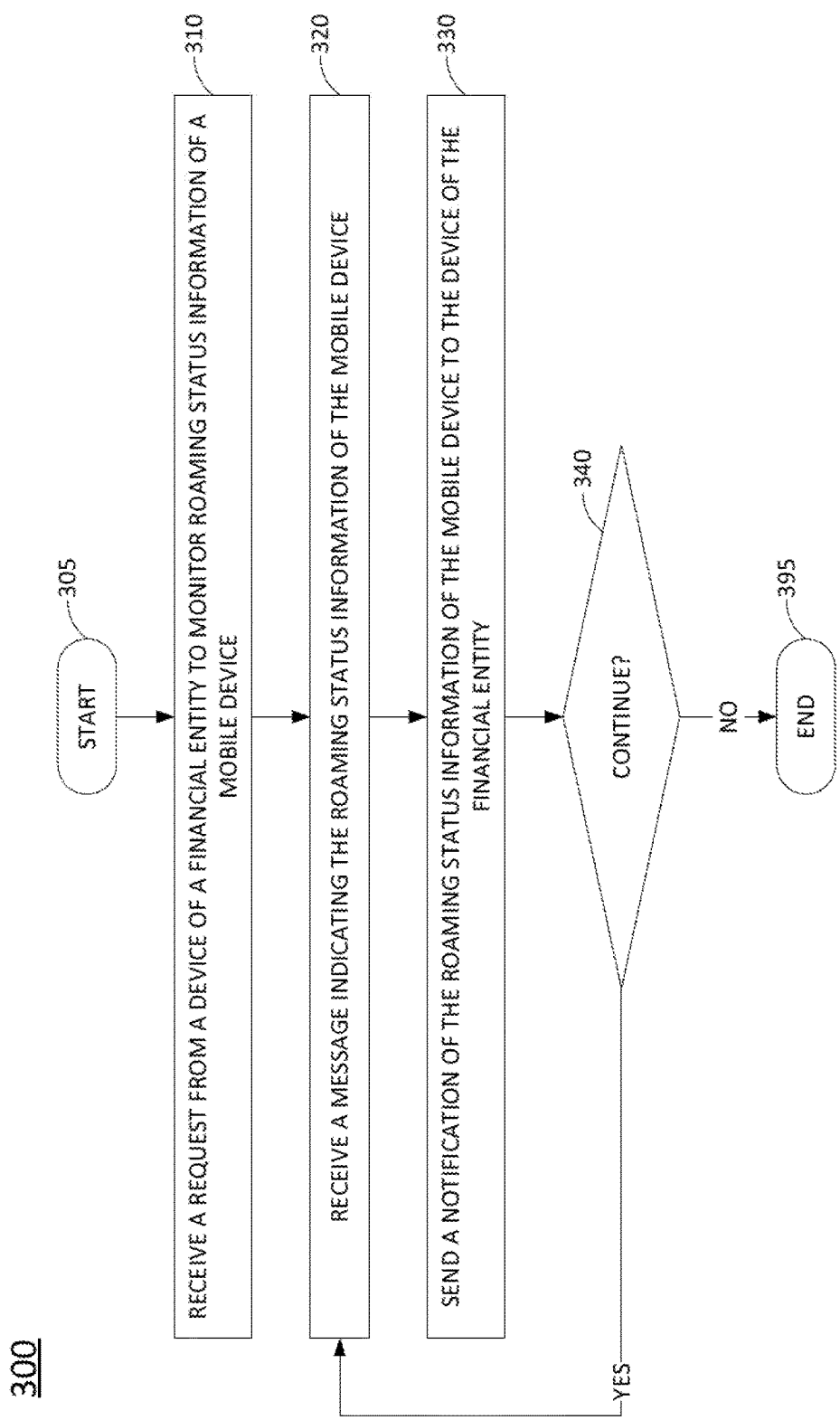
FIG. 3 illustrates a flowchart of a method for providing mobile device roaming status information to authorize a pending payment transaction, according to the present disclosure.

FIG. 3 illustrates a flowchart of a method 300 for providing mobile device roaming status information to authorize a pending payment transaction, according to the present disclosure. In one example, the steps, operations, or functions of the method 300 may be performed by any one or more of the components of the system 100 depicted in FIG. 1. For example, the method 300 may be performed by roaming status server 121. In another example, the method 300 is performed by roaming status server 121 in conjunction with additional devices, such as one or more of production server 123, MIND server 124, and subscription interface server 122 in a distributed and coordinated manner. Alternatively, or in addition, one or more steps, operations, or functions of the method 300 may be implemented by a computing device having a processor, a memory, and input/output devices as illustrated below in FIG. 4, specifically programmed to perform the steps, functions, and/or operations of the method. Although any one of the elements system 100 may be configured to perform various steps, operations, or functions of the method 300, the method will now be described in terms of an example where steps of the method are performed by a processor, such as processor 402 in FIG. 4.

The method 300 begins in step 305 and proceeds to step 310. At step 310, the processor receives a request from a device of a financial entity to monitor roaming status information of a mobile device. For example, a financial entity may receive authorization from a user who is also a credit card holder, account holder, or the like to monitor the roaming status information of the user's mobile device. In one example, the request may comprise a subscription request. In one example, the request may pertain to one or more groups of mobile devices, where at least one of the groups includes the mobile device of the user. In one example, the request may include one or more mobile device identifiers that may have been received by the financial entity from the user, such as: an IMSI, an IMEI, a MSIN, a MEID, an ESN or MIN, an ICCID, a telephone number, e.g., an E.164, a number or a number that is translatable into E.164 format, and the like. In addition, the request may specify one or more destinations to which roaming status information regarding the mobile device should be sent. In one example, the one or more destinations may be assigned on a per-group basis, where the request may include one or more groups.

At step 320, the processor receives a message indicating the roaming status information of the mobile device. In one example, the message is received from a different cellular service provider network that is servicing the mobile device (e.g., a roaming carrier network that is a different cellular service provider from the home network in which the processor performing the method 300 may be deployed). The message may indicate that the mobile device is roaming on the different cellular service provider network, where the different cellular service provider network may be deployed in a foreign country (where "foreign" is in relation to the country of mobile device's home network). In another example, the message may be received from one or more components of the home network, indicating that the mobile device has been detected on the cellular service provider network, and is therefore located within the home country. For instance, the message may be received as part of a data feed from another component of the cellular service provider network. For example, the processor may be deployed in roaming status server 121 and receive the message from production server 123 in FIG. 1. In another example, the message may be received directly from the one or more components of the home network.

In one example, the message may include one or more identifiers of the mobile device, a country code, e.g., a mobile country code (MCC), and a time stamp. Alternatively, or in addition, the message may include a carrier code of the different cellular service provider network, e.g., a mobile network code (MNC), a public land mobile network identity (PLMN-ID), a tracking area code (TAC), a globally unique tracking area identity (TAI), and other more or less detailed information.

At step 330, the processor sends a notification of the roaming status information of the mobile device to a device of the financial entity. In one example, the notification may include all or a portion of the information contained in the message received at step 320. In one example, the notification is sent when the message received at step 320 indicates a change to the roaming status information of the mobile device. Thus, step 330 may include comparing new roaming status information received in the message at step 320 with stored roaming status information to determine if such a change has occurred. As an example, the message may indicate that the mobile device has been detected on the home network, whereas the previously stored roaming status information may indicate that the mobile device was roaming on a different cellular service provider network.

At step 340, the processor determines whether to continue. For example, the processor may receive an instruction to shut down for maintenance, or may receive an instruction to stop processing roaming status information regarding one or more mobile device. For instance, the user may notify the cellular service provider network and/or the financial entity that an authorization to monitor roaming status information has been revoked for the user's mobile device. In another example, the payment device, such as a credit card, a debit card, an electronic payment device, a check, and so forth, may be cancelled by the user and/or by the financial entity. Thus, the processor may receive a notification from the financial entity that the mobile device roaming status information should no longer be processed. When, for any of the above reasons, or for any other reason, it is determined not to continue, then the method 300 proceeds to step 395 where the method ends.

On the other hand, when it is determined to continue, e.g., when there is no indication that the processor should stop performing steps 320-330, the method 300 proceeds back to step 320. In subsequent iterations of steps 320 and 330, the processor may continue to receive further messages indicating the roaming status information of the mobile device, and may convey further notifications to a device of a financial entity, e.g., indicating any changes to the roaming status information that are detected. For instance, the processor may receive a further message indicating a change to the roaming status information of the mobile device, e.g., indicating that the mobile device has been detected on the home network, whereas the message received in a previous iteration of step 320 may have indicated that the mobile device was roaming on a different cellular service provider network. At step 395, the method 300 ends.

In addition, although not specifically specified, one or more steps, functions or operations of the methods 200 and 300 may include a storing, displaying and/or outputting step as required for a particular application. In other words, any data, records, fields, and/or intermediate results discussed in the respective methods can be stored, displayed and/or outputted either on the device executing the method 200 or 300, or to another device, as required for a particular application.

Furthermore, steps, blocks, functions or operations in FIGS. 2 and 3 that recite a determining operation or involve a decision do not necessarily require that both branches of the determining operation be practiced. In other words, one of the branches of the determining operation can be deemed as an optional step. In addition, one or more steps, blocks, functions or operations of the above described methods 200 and 300 may comprise optional steps, or can be combined, separated, and/or performed in a different order from that described above, without departing from the example embodiments of the present disclosure.

As such, the present disclosure provides at least one advancement in the technical field of detecting and preventing fraudulent payment device usage. This advancement is in addition to the traditional methods of requiring additional identification or a signature from a purchaser at a point-of-sale when a purchase price exceeds a certain amount, or for blocking transactions that are out of the ordinary for the purchaser. In particular, the present disclosure enables automatic detection of potential fraudulent usage of a user's credit card or other payment device by providing push notifications of roaming status information of a mobile device associated with the user and correlating such information with a known location of a point-of-sale for a payment transaction involving the payment device.

The present disclosure also provides a transformation of data, e.g., payment location data and device roaming status information are transformed into a determination as to whether a pending payment transaction should continue to be processed or instead should be declined.

Finally, embodiments of the present disclosure improve the functioning of a computing device, e.g., a server. Namely, a server for authorizing a payment transaction is improved by the use of payment location data and device roaming status information, to provide a more robust payment transaction processing method.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for authorizing a pending payment transaction using mobile device roaming status information or for providing mobile device roaming status information to authorize a pending payment transaction, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or 300 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method. In one embodiment, instructions and data for the present module or process 405 for authorizing a pending payment transaction using mobile device roaming status information or for providing mobile device roaming status information to authorize a pending payment transaction (e.g., a software program comprising computer-executable instructions) can be loaded into memory 404 and executed by hardware processor element 402 to implement the steps, functions or operations as discussed above in connection with the illustrative methods 200 and 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for authorizing a pending payment transaction using mobile device roaming status information or for providing mobile device roaming status information to authorize a pending payment transaction (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method, comprising:
receiving, by a processor deployed in a cellular service provider network, from a device of a financial entity, a request to register a subscription for receiving roaming status update notifications of roaming status information of a mobile device without an occurrence of an attempted payment transaction of a payment device associated with a user of the mobile device at a payment location;
receiving, by the processor, a message indicating the roaming status information of the mobile device; and
sending, by the processor, in response to the receiving the message and based on the subscription, a roaming status update notification of the roaming status information of the mobile device to the device of the financial entity when the message indicating the roaming status information of the mobile device is received, wherein the roaming status update notifications comprise the roaming status update notification.

2. The method of claim 1, wherein the message indicating the roaming status information of the mobile device is received from a different cellular service provider network that is servicing the mobile device.

3. The method of claim 2, wherein the different cellular service provider network is deployed in a different country than the cellular service provider network.

4. The method of claim 2, wherein the message indicating the roaming status information of the mobile device indicates that the mobile device is roaming on the different cellular service provider network.

5. The method of claim 1, wherein the message indicating the roaming status information of the mobile device indicates that the mobile device has been detected on the cellular service provider network.

6. The method of claim 5, wherein the mobile device was roaming on a different cellular service provider network prior to the mobile device being detected on the cellular service provider network.

7. The method of claim 1, wherein the request comprises a mobile device identifier of the mobile device.

8. The method of claim 1, wherein the request from the device of the financial entity comprises a request to register a subscription for receiving roaming status update notifications of roaming status information of a plurality of mobile devices, wherein the plurality of mobile devices includes the mobile device.

9. The method of claim 1, wherein the user associated with the mobile device has authorized the financial entity to register the subscription.

10. The method of claim 1, further comprising:
receiving a further message indicating a change to the roaming status information of the mobile device, wherein the message indicating the roaming status information indicates that the mobile device is roaming on a different cellular service provider network, and wherein the further message indicating the change to the roaming status information indicates that the mobile device has been detected on the cellular service provider network; and
sending a further roaming status update notification of the roaming status information of the mobile device to the device of the financial entity when the further message indicating the change to the roaming status information of the mobile device is received, wherein the roaming status update notifications comprise the further roaming status update notification.

11. The method of claim 1, wherein the roaming status information includes: an identifier of the mobile device, a country code, and a time stamp.

12. A method, comprising:
receiving, by a processor, an authorization to register a subscription for receiving roaming status update notifications of roaming status information of a mobile device without receiving a notification of an attempted payment transaction of a payment device associated with a user of the mobile device at a payment location;

sending, by the processor, to a cellular service provider network, in response to the receiving the authorization to register the subscription, a request to register the subscription for receiving the roaming status update notifications of the roaming status information of the mobile device without receiving the notification of the attempted payment transaction of the payment device associated with the user of the mobile device at the payment location;

receiving, by the processor from the cellular service provider network and based on the subscription, a roaming status update notification of the roaming status information of the mobile device, wherein the roaming status update notifications comprise the roaming status update notification;

receiving, by the processor, the notification of the attempted payment transaction of the payment device associated with the user of the mobile device at the payment location; and sending, by the processor, an authorization to continue processing the attempted payment transaction when the roaming status information indicates that a location of the mobile device corresponds to the payment location.

13. The method of claim 12, further comprising:

sending a message to cancel the attempted payment transaction when the roaming status information indicates that the location of the mobile device does not correspond to the payment location.

14. The method of claim 12, wherein the notification of the attempted payment transaction is received from a device that is processing the attempted payment transaction, and wherein the authorization to continue processing the attempted payment transaction is sent to the device that is processing the attempted payment transaction.

15. The method of claim 12, wherein the attempted payment transaction is associated with a point-of-sale terminal, and wherein the payment location comprises a location of the point-of-sale terminal.

16. The method of claim 12, wherein the processor is deployed in a device of a financial entity.

17. The method of claim 12, further comprising:

determining the location of the mobile device from the roaming status information, wherein the location of the mobile device is determined from a country code in the roaming status information;

comparing the payment location of the attempted payment transaction with the location of the mobile device as determined from the roaming status information; and generating the authorization to continue processing the attempted payment transaction when the roaming status information indicates that the location of the mobile device corresponds to the payment location.

18. The method of claim 12, wherein the roaming status information is determined from a message that is received from a different cellular service provider network that is servicing the mobile device.

19. The method of claim 12, wherein the roaming status information is determined from a message that is received from a component of the cellular service provider network that indicates that the mobile device has been detected on the cellular service provider network.

20. A device, comprising:

a processor; and a computer-readable medium storing instructions which, when executed by the processor, cause the processor to perform operations, the operations comprising:

receiving an authorization to register a subscription for receiving roaming status update notifications of roaming status information of a mobile device without receiving a notification of an attempted payment transaction of a payment device associated with a user of the mobile device at a payment location;

sending, to a cellular service provider network, in response to the receiving the authorization to register the subscription, a request to register the subscription for receiving the roaming status update notifications of the roaming status information of the mobile device without receiving the notification of the attempted payment transaction of the payment device associated with the user of the mobile device at the payment location;

receiving from the cellular service provider network and based on the subscription a roaming status update notification of the roaming status information of the mobile device, wherein the roaming status update notifications comprise the roaming status update notification;

receiving the notification of the attempted payment transaction of the payment device associated with the user of the mobile device at the payment location; and sending an authorization to continue processing the attempted payment transaction when the roaming status information indicates that a location of the mobile device corresponds to the payment location.

* * * * *